United States Patent
Nihei (10) Patent No.: US 8,837,057 B2
(45) Date of Patent: Sep. 16, 2014

(54) OPTICAL UNIT, METHOD OF PRODUCING THE SAME, AND IMAGE PICKUP APPARATUS

(75) Inventor: Yasuhide Nihei, Kanagawa (JP)

(73) Assignee: Sony Corporation, Tokyo (JP)

( * ) Notice: Subject to any disclaimer, the term of this patent is extended or adjusted under 35 U.S.C. 154(b) by 35 days.

(21) Appl. No.: 13/572,054

(22) Filed: Aug. 10, 2012

(65) Prior Publication Data

US 2013/0038775 A1 Feb. 14, 2013

(30) Foreign Application Priority Data

Aug. 12, 2011 (JP) ................. 2011-177137

(51) Int. Cl.
- *G02B 13/18* (2006.01)
- *G02B 13/14* (2006.01)
- *B32B 38/04* (2006.01)
- *H04N 5/225* (2006.01)

(52) U.S. Cl.
CPC ............. *B32B 38/04* (2013.01); *H04N 5/225* (2013.01); *G02B 13/18* (2013.01)
USPC ............................ 359/708; 359/357; 359/713

(58) Field of Classification Search
USPC .......................... 359/357, 708, 713; 264/1.32
See application file for complete search history.

(56) References Cited

U.S. PATENT DOCUMENTS

| | | | |
|---|---|---|---|
| 2010/0290123 | A1 | 11/2010 | Yamada et al. |
| 2011/0007195 | A1* | 1/2011 | Fukuta ........................ 348/294 |
| 2011/0051390 | A1* | 3/2011 | Lin et al. ..................... 361/818 |
| 2012/0218648 | A1* | 8/2012 | Lin et al. ..................... 359/715 |

FOREIGN PATENT DOCUMENTS

| | | |
|---|---|---|
| JP | 2010-103490 | 5/2010 |
| JP | 2010-266667 | 11/2010 |
| JP | 2011-048303 | 3/2011 |
| JP | 2011-059678 | 3/2011 |

\* cited by examiner

*Primary Examiner* — Ricky Mack
*Assistant Examiner* — William Alexander
(74) *Attorney, Agent, or Firm* — Oblon, Spivak, McClelland, Maier & Neustadt, L.L.P.

(57) ABSTRACT

An optical unit includes a plurality of lenses arranged along an optical path from an object side toward an image side, the plurality of lenses including at least one lens including an image side surface and an object side surface, one of which is formed to be an aspheric surface at wafer level, the aspheric surface of the at least one lens being formed to serve as one of an aperture stop surface having an aperture stop function and a light-shielding surface having a light-shielding function.

9 Claims, 8 Drawing Sheets

OPTICAL UNIT, METHOD OF PRODUCING THE SAME, AND IMAGE PICKUP APPARATUS

BACKGROUND

The present technology relates to an optical unit using a wafer-level lens, a method of producing the same, and an image pickup apparatus.

In recent years, a mobile electronic apparatus such as a cell phone installs therein a small and thin image pickup apparatus.

Such an image pickup apparatus includes an image pickup element such as a charge coupled device (CCD) or complementary metal oxide semiconductor (CMOS) image sensor and a lens system that forms an object image on the image pickup element.

A cell pitch of the image pickup element such as the CCD or CMOS image sensor is dramatically decreased in such an optical system, and hence it is desirable that the optical system have a high image forming performance in which optical aberration, in particular, axial chromatic aberration is made lower than that of a typical optical system.

In order to meet the cost requirements, there is known a technique of forming lenses at wafer level, to thereby reduce the costs.

As a representative example of such a technique, a technique disclosed in Japanese Patent Application Laid-open No. 2010-266667 (hereinafter, referred to as Patent Document 1) is known.

Patent Document 1 describes a wafer-level lens array including a plurality of two-dimensionally arranged lenses and a substrate connecting the lenses to one another, which are integrally formed of a resin material.

SUMMARY

By the way, it is strongly demanded that the image pickup apparatus in recent years to be installed into a cell phone, a personal computer (PC), or the like have high resolution and be reduced in cost, size, and height.

Producing lenses at wafer level as one of methods for reducing the costs is a very excellent method in terms of cost reduction and the like. However, it is still a technique for the low pixel density area and it is not yet an effective technique for the high pixel density area.

The number of lenses is increased in order to maintain the performance in the high pixel density area, which causes problems that a light-shielding structure becomes complex and that the size increases due to the increased number of components. It is difficult to solve the two problems at the same time.

These problems are caused mainly by unevenness of lenses and edges of the lenses in a wafer.

It is difficult to take measures using an aperture stop, light shielding, and the like in a wafer-level lens because unevenness is generally formed in the wafer as described in Patent Document 1.

As the measures using the aperture stop, the light shielding, and the like, the following methods are used in the existing structures:

(1) providing an uneven surface with a light-shielding function by lithography or using a resist, for example; and (2) incorporating a separate component such as a light-shielding tube.

As the above-mentioned method (1), as disclosed in Japanese Patent Application Laid-open No. 2011-059678, there is a method of directly adding a light-shielding function to an uneven portion.

However, in this method, there is a disadvantage of restrictions on use of material and process and it is difficult to maintain necessary accuracy. Further, in a high pixel lens having an increased number of surfaces, flare and ghost become very big problems.

Regarding the above-mentioned method (2), there is a structure as disclosed in Japanese Patent Application Laid-open No. 2011-048303. However, a batch processing to bond wafer-like sheets would not secure the accuracy of positioning a component such as an aperture spot that needs positioning accuracy. This is because there is a difference in expansion rate between a lens material and a light-shielding member material.

There is a need to individually position such a component for each lens, which is a very complicated and time consuming work.

The number of components and steps unfortunately increases in the wafer level process aimed at an inexpensive and simple process and design constraints, for example, limitation on lens intervals are imposed due to provision of the separate components. Thus, there are problems of a reduction in height, size, and cost.

In a wafer level camera having a lens shape as illustrated in Japanese Patent Application Laid-open No. 2010-103490, the disadvantages of forming an infrared cut filter (IRCF) directly on a lens wafer surface having curvature are as follows.

Specifically, it is difficult to form a uniform film of an IR cut filter on an uneven surface, causing problems of film non-uniformity, pin holes, characteristic failure, and the like.

Thus, there is a need for providing a wafer-level lens and an image pickup apparatus that are capable of realizing an aperture stop or a light-shielding structure easily with high accuracy.

According to a first embodiment of the present technology, there is provided an optical unit, including:

a plurality of lenses arranged along an optical path from an object side toward an image side, the plurality of lenses including at least one lens including an image side surface and an object side surface, one of which is formed to be an aspheric surface at wafer level, the aspheric surface of the at least one lens being formed to serve as one of an aperture stop surface having an aperture stop function and a light-shielding surface having a light-shielding function.

According to a second embodiment of the present technology, there is provided a method of producing an optical unit, including:

forming a plurality of lenses on each of wafers at wafer level, the plurality of lenses being to be arranged along an optical path from an object side toward an image side;

bonding the plurality of lenses each formed on the wafer at wafer level to each other; and dicing the bonded wafers to form a number of optical units, the forming a plurality of lenses including forming one of an image side surface and an object side surface of at least one lens of the plurality of lenses to be an aspheric surface at wafer level, and forming the aspheric surface of the at least one lens to serve as one of an aperture stop surface having an aperture stop function and a light-shielding surface having a light-shielding function.

According to a third embodiment of the present technology, there is provided an image pickup apparatus, including:

an image pickup element;

an optical unit configured to form an object image on the image pickup element; and a signal processing unit configured to perform predetermined signal processing on an output signal of the image pickup element, the optical unit including a plurality of lenses arranged along an optical path from an object side toward an image side, the plurality of lenses including at least one lens including an image side surface and an object side surface, one of which is formed to be an aspheric surface at wafer level, the aspheric surface of the at least one lens being formed to serve as one of an aperture stop surface having an aperture stop function and a light-shielding surface having a light-shielding function.

According to the present technology, it is possible to realize an aperture stop or a light-shielding structure easily with high accuracy These and other objects, features and advantages of the present technology will become more apparent in light of the following detailed description of best mode embodiments thereof, as illustrated in the accompanying drawings.

DETAILED DESCRIPTION OF EMBODIMENTS

Hereinafter, an embodiment of the present technology will be described with reference to the accompanying drawings.

The description will be made in the following order:
1. first configuration example of optical unit;
2. second configuration example of optical unit;
3. third configuration example of optical unit;
4. method of producing optical unit; and
5. configuration example of image pickup apparatus.
<1. First Configuration Example of Optical Unit>

Figure 1:
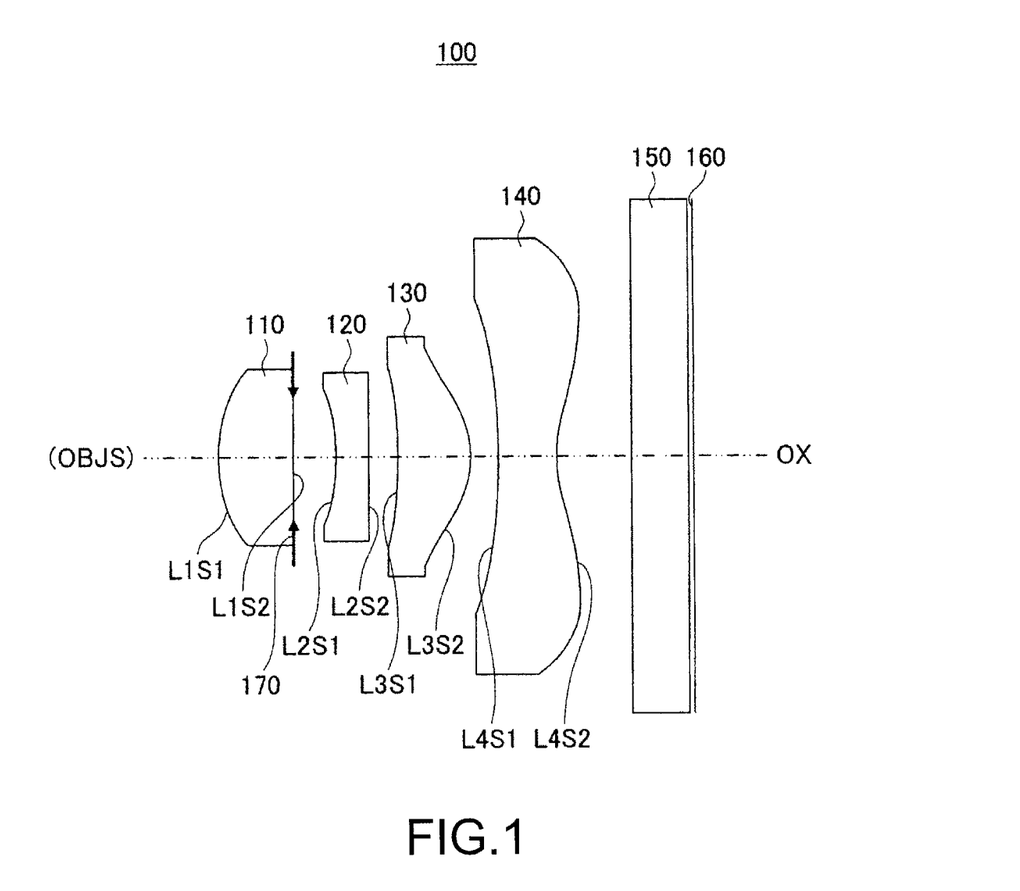
FIG. 1 is a diagram showing a first configuration example of an optical unit according to an embodiment of the present technology.

FIG. 1 is a diagram showing a first configuration example of an optical unit according to this embodiment.

An optical unit 100 according to this embodiment includes a plurality (four in this embodiment) of lenses arranged along an optical path from an object side OBJS toward an image side.

In the optical unit 100, an image side surface or an object side surface (an image side surface in this embodiment) of one of the plurality of lenses is a wafer level aspheric surface. This aspheric surface is processed so that it behaves as an aperture stop surface having an aperture stop function.

The aperture stop is in the form of a film on the aspheric surface.

Specifically, in FIG. 1, the optical unit 100 includes a first lens 110, a second lens 120, a third lens 130, a fourth lens 140, a cover glass 150, and an image plane 160 arranged in this order from the object side OBJS toward the image side.

The first, second, third, and fourth lenses 110, 120, 130, and 140 are formed of a glass, an ultraviolet (UV) curing resin, a thermosetting resin, a plastic, or the like.

As a whole, the optical unit 100 includes lens surfaces including a first surface L1S1, a second surface L1S2, a third surface L2S1, a fourth surface L2S2, a fifth surface L3S1, a sixth surface L3S2, a seventh surface L4S1, and an eighth surface L4S2.

The first lens 110 is a plano-convex lens having a convex surface on the object side and an aspheric surface on the image side.

In other words, the first lens 110 has the first surface L1S1 formed of a convex object side surface and the second surface L1S2 formed of an aspheric image side surface.

The second surface L1S2 being the image side surface of the first lens 110 is an aspheric surface formed at wafer level and processed to be an aperture stop surface having the function of an aperture stop 170 by coating, lithography, or the like on the aspheric surface.

In this way, in the optical unit 100 of the first configuration example, the second surface L1S2 of the first lens 110 is formed in the film form by applying the aperture stop 170 to the aspheric surface at wafer level.

The function of this aperture stop 170 determines a lens's brightness indicated by the F-number (FNO).

The second lens 120 is a convex-concave lens having a concave surface on the object side and a convex surface on the image side.

In other words, the second lens 120 has the third surface L2S1 formed of a concave object side surface and the fourth surface L2S2 formed of a convex image side surface.

The third lens 130 is a convex-concave lens having a concave surface on the object side and a convex surface on the image side.

In other words, the third lens 130 has the fifth surface L3S1 formed of a concave object side surface and the sixth surface L3S2 formed of a convex image side surface.

The fourth lens 140 is a lens having a concave surface on the object side, and a concave inner surface portion transverse to and near an optical axis OX and a convex outer surface portion on the image side.

In other words, the fourth lens 140 has the seventh surface L4S1 formed of a concave object side surface and the eighth surface L4S2 formed of a concave-convex image side surface.

It is assumed that, for the optical unit 100 with a single focus, the image plane 160 is an image pickup or receiving plane of a solid-state image pickup element such as a charge-coupled device (CCD) sensor or a complementary metal-oxide semiconductor (CMOS) sensor.

The cover glass 150 is positioned between the eighth surface L4S2 and the image plane 160. Other optical element(s) may be positioned between the eighth surface L4S2 and the image plane 160 in addition to a cover glass of a resin or glass, an infrared cut filter, and a low pass filter, and the like.

In this embodiment, in FIG. 1, the left-hand side is the object side (front) and the right-hand side is the image side (rear).

Incident light flux from the object side passes through the first lens 110, the aperture stop 170, the second lens 120, the third lens 130, and the fourth lens 140 and forms an image on the image plane 160.

As can be seen above, according to the optical unit 100 shown in FIG. 1, the second surface L1S2 being the image side surface of the first lens 110 is an aspheric surface formed at wafer level and processed to be an aperture stop surface having the function of an aperture stop 170 by coating or the like on the aspheric surface.

Thus, it is possible to realize an aperture stop easily with high accuracy. It is also possible to reduce the number of components to save cost because the aperture stop is adhered to the first lens. The optical properties are improved because, unlike an external component, the thickness of the aperture stop portion is added to eliminate a cause of ghost and a drop in intensity of peripheral light.

According to this embodiment, it is possible to provide an optical unit which is bright, high in resolution, small in size, and optimal for a fixed focus (FF) lens.

<2. Second Configuration Example of Optical Unit>

Figure 2:
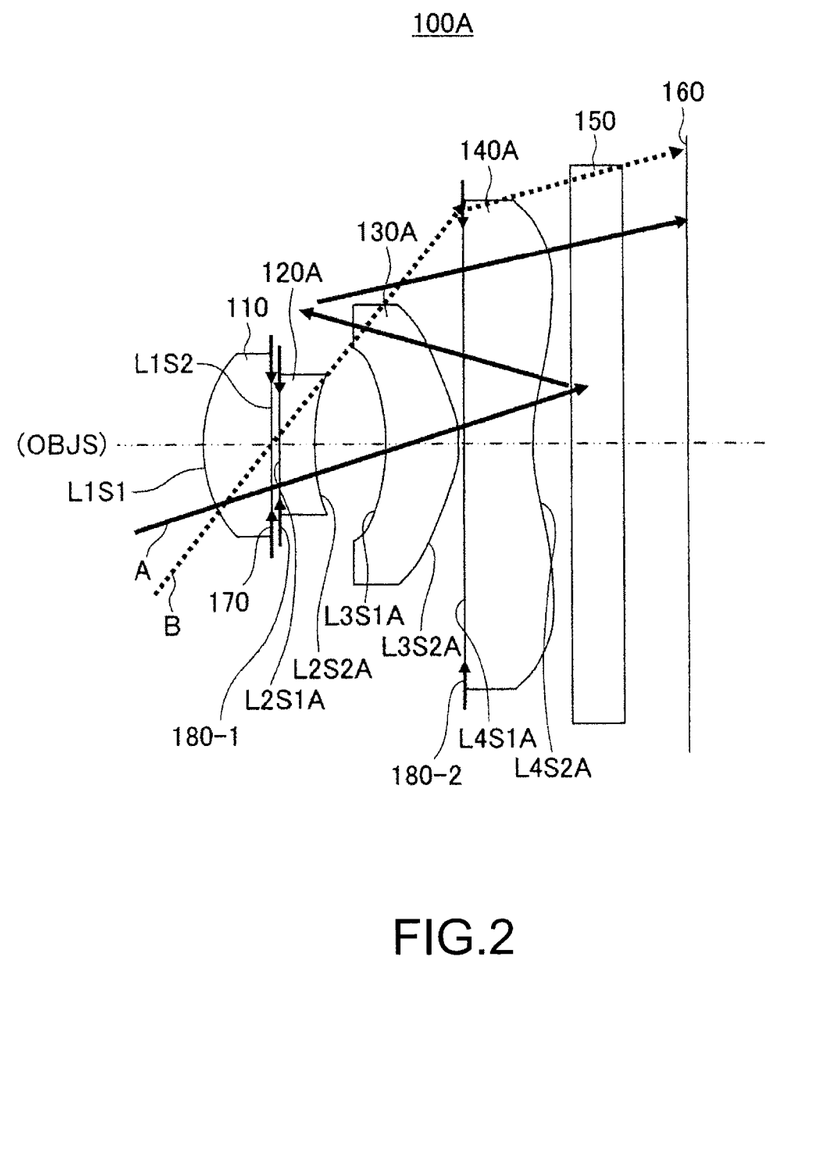
FIG. 2 is a diagram showing a second configuration example of the optical unit according to the embodiment.

FIG. 2 is a diagram showing a second configuration example of the optical unit according to this embodiment.

Points of difference between an optical unit 100A shown in FIG. 2 and the optical unit 100 shown in FIG. 1 are as follows.

According to the optical unit 100A shown in FIG. 2, a third surface L2S1A being the object side surface of a second lens 120A and a seventh surface L4S1A being the object side surface of a fourth lens 140A are aspheric surfaces formed at wafer level.

The aspheric surface (the third surface L2S1A) of the second lens 120A and the aspheric surface (the seventh surface L4S1A) of the fourth lens 140A are formed as light-shielding surfaces having the functions of light-shielding portions (light-shielding films) 180-1 and 180-2 by coating or the like.

A first lens 110 is a plano-convex lens having a convex surface on the object side and an aspheric surface on the image side.

In other words, the first lens 110 has a first surface L1S1 formed of a convex object side surface and a second surface L1S2 formed of an aspheric image side surface.

The second surface L1S2 being the image side surface of the first lens 110 is an aspheric surface formed at wafer level and processed to be an aperture stop surface having the function of an aperture stop 170 by coating, lithography, or the like on the aspheric surface.

In this way, in the optical unit 100A of the second configuration example, the second surface L1S2 of the first lens 110 is formed to be the aspheric surface coated with the aperture stop 170 at wafer level.

The function of this aperture stop 170 determines a lens's brightness indicated by the F-number (FNO).

The second lens 120A is a plano-concave lens having an aspheric surface on the object side and a concave surface on the image side.

In other words, the second lens 120A has the third surface L2S1A formed of an aspheric object side surface and a fourth surface L2S2A formed of a concave image side surface.

The third surface L2S1A being the object side surface of the second lens 120A is an aspheric surface formed at wafer level and processed to be a light-shielding surface having the function of the light-shielding portion 180-1 by coating, lithography, or the like on the aspheric surface.

A third lens 130A is a convex-concave lens having a concave surface on the object side and a convex surface on the image side.

In other words, the third lens 130A has a fifth surface L3S1A formed of a concave object side surface and a sixth surface L3S2A formed of a convex image side surface.

The fourth lens 140A is a lens having an aspheric surface on the object side, and a concave inner surface portion transverse to and near an optical axis OX and a convex outer surface portion on the image side.

In other words, the fourth lens 140A has the seventh surface L4S1A formed of an aspheric object side surface and an eighth surface L4S2A formed of a concave-convex image side surface.

The seventh surface L4S1A being the object side surface of the fourth lens 140A is an aspheric surface formed at wafer level and processed to be a light-shielding surface having the function of light-shielding portion 180-2 by coating, lithography, or the like on the aspheric surface.

Figure 3:
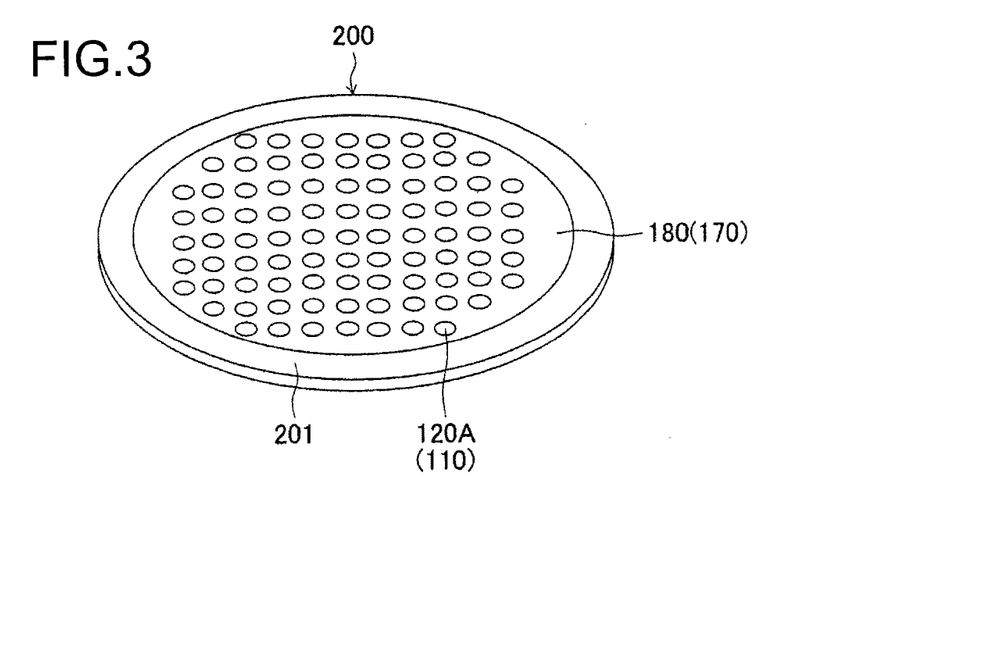
FIG. 3 is a diagram showing an example in which a surface to be a light-shielding surface or an aperture stop surface is formed to be an aspheric surface at wafer level and this aspheric surface is coated with a light-shielding surface or an aperture stop.

FIG. 3 is a diagram showing an example in which a surface to be a light-shielding surface or an aperture stop surface is formed to be an aspheric surface at wafer level and this aspheric surface is coated with a light-shielding surface or an aperture stop.

In the example of FIG. 3, a number of second lenses 120A are two-dimensionally arranged within a wafer 200 and surfaces of the second lenses 120A to be the third surfaces L2S1A are formed to be an aspheric surface.

Then, on an aspheric surface 201 of this wafer 200, a light-shielding surface having the function of the light-shielding portion 180(-1, -2) is formed by coating, lithography, or the like.

Here, the example in which the third surface L2S1A of each of the second lenses 120A is an aspheric surface and a light-shielding portion is formed on this aspheric surface is described. The same is applied to the case where the seventh surface L4S1A of each of the fourth lenses 140A is an aspheric surface and a light-shielding portion is formed on this aspheric surface and the case where the second surface L1S2 of each of the first lenses 120 is an aspheric surface and an aperture stop is formed on this aspheric surface.

In FIG. 2, the solid line arrows A and broken line arrows B show ghost paths.

The arrows A indicate a ghost path to generate a ghost image due to reflections between pairs of surfaces, and the arrows B indicate a ghost path to generate a ghost image when an unnecessary incident light from outside the filming range passes through edges of lenses.

The light-shielding portions 180-1 and 180-2 on the aspheric surface are effective to prevent occurrence of ghost images due to both of the above-mentioned causes.

As can be seen above, according to the optical unit 100A shown in FIG. 2, the second surface L1S2 being the image side surface of the first lens 110 is an aspheric surface formed at wafer level and processed to be an aperture stop surface having the function of an aperture stop 170 by coating or the like on the aspheric surface.

Further, according to the optical unit 100A, the aspheric surface (the third surface L2S1A) of the second lens 120A and the aspheric surface (the seventh surface L4S1A) of the fourth lens 140A are formed as the light-shielding surfaces having the functions of the light-shielding portions (light-shielding film) 180-1 and 180-2 by coating or the like.

Thus, it is possible to realize an aperture stop and a light-shielding structure easily with high accuracy. It is also possible to reduce the number of components to save cost because the aperture stop and light-shielding structure are adhered to the first, second and fourth lenses. The optical properties are improved because, unlike an external component, the thickness of the aperture stop portion is added to eliminate a cause of ghost and a drop in intensity of peripheral light.

According to this embodiment, it is possible to provide an optical unit which is bright, high in resolution, small in size, and optimal best for a fixed focus (FF) lens.

<3. Third Configuration Example of Optical Unit>

Figure 4:
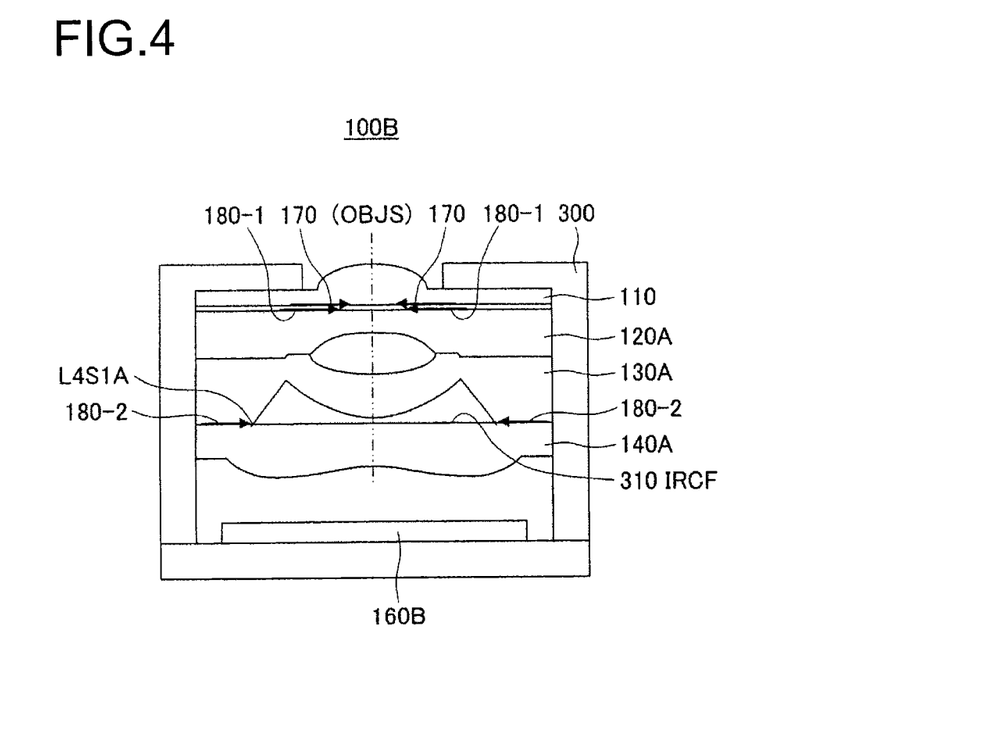
FIG. 4 is a diagram showing a third configuration example of the optical unit according to the embodiment.

FIG. 4 is a diagram showing a third configuration example of the optical unit according to this embodiment.

Points of difference between an optical unit 100B shown in FIG. 4 and the optical unit 100A shown in FIG. 2 are as follows.

According to the optical unit 100B shown in FIG. 4, a first lens 110, a second lens 120A, a third lens 130A, a fourth lens 140B, and an image pickup element 160B including an image plane 160, which basically have the same configurations as the optical unit 100A shown in FIG. 2, are placed in a lens holder 300.

In other words, the optical unit 100B shown in FIG. 4 is modularized.

In the optical unit 100B shown in FIG. 4, an infrared cut filter (IRCF) 310 is formed by deposition on an aspheric surface portion other than the light-shielding portion 180-2 of the seventh surface L4S1A of the fourth lens 140A nearest to the image plane of the image pickup element, where an object image is formed.

According to the optical unit 100B, easy formation of the IRCF by deposition is of great advantage to achieve a reduction in height and cost.

Figure 5A:
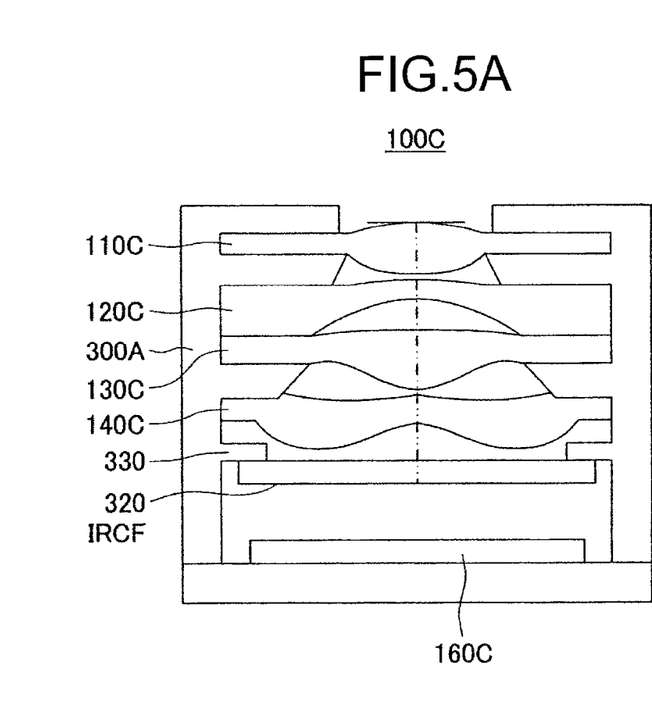
FIGS. 5A and 5B are diagrams for comparing the optical unit shown in FIG. 4 to an optical unit formed, as a comparative example, of lenses having no aspheric surface.
Figure 5B:
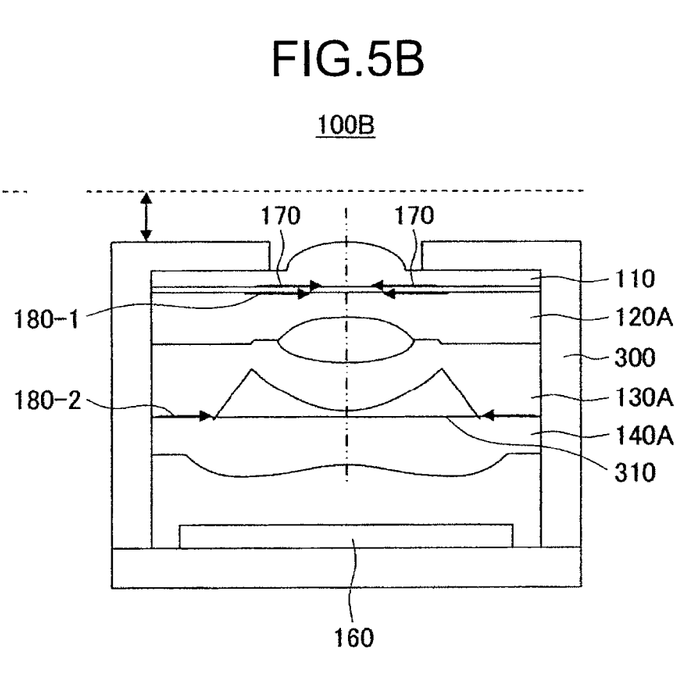

FIGS. 5A and 5B are diagrams for comparing the optical unit shown in FIG. 4 to an optical unit formed, as a comparative example, of lenses having no aspheric surface.

FIG. 5A shows the optical unit as the comparative example and FIG. 5B shows the optical unit shown in FIG. 4.

Unlike the optical unit 100B according to this embodiment, in an optical unit 100C as the comparative example, all lenses are curved lenses and the surfaces on which an aperture stop and a light-shielding portion are to be formed are not aspheric.

The modularized optical unit 100C becomes bulky as shown in FIG. 5A because it is difficult to deposit an IRCF film directly on any of the curved lenses.

Since the IRCF 320 is separately provided to a lens holder 300A, the lens holder 300A needs a retention mechanism 330. Retention mechanisms for other lenses are also necessary.

In this case, the additional thickness is necessary for the IRCF 320 itself and its retention mechanism 330, causing an increase in cost.

In contrast, as shown in FIGS. 4 and 5B, the optical unit 100B according to this embodiment is of great advantage to achieve a reduction in height and cost because the light-shielding aspheric surface allows direct deposition of the IRCF film thereto.

The optical unit 100B according to this embodiment advantageously improves frequent occurrence of a problem that shading occurs at or near the IRCF film because the incident light has such an incident angle that the direction of the incident light becomes closer to a parallel relation to the lens surface.

<4. Method of Producing Optical Unit>

Figure 6:
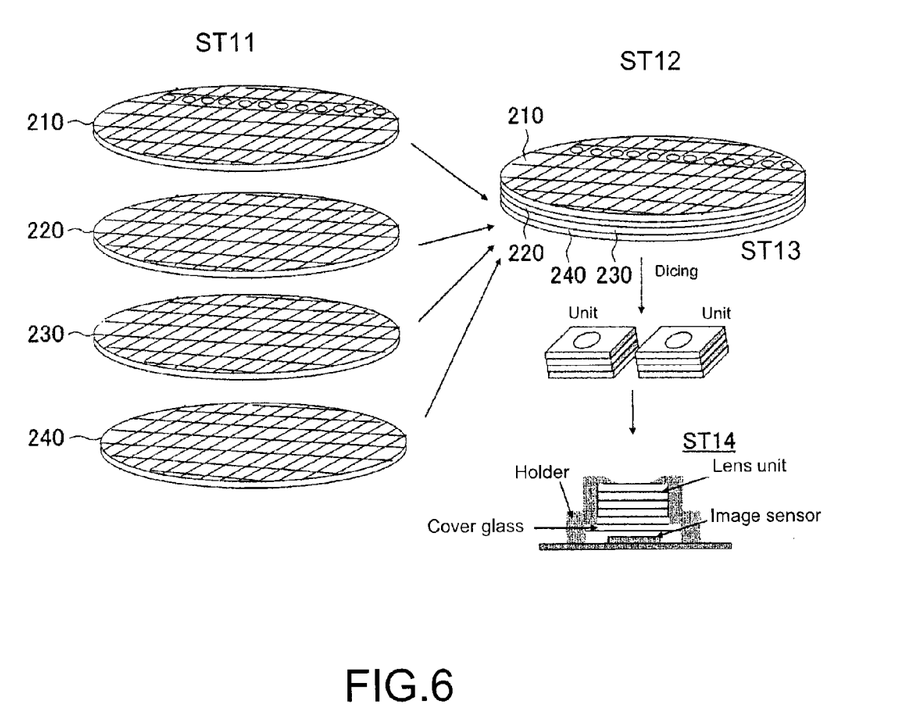
FIG. 6 is a diagram illustrating the entire outline of a method of producing the optical unit according to the embodiment.
Figure 7A:
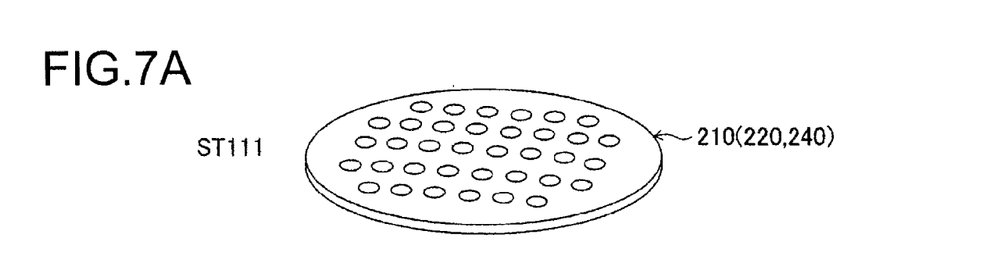
FIGS. 7A and 7B are diagrams illustrating the main part of the method of producing the optical unit according to the embodiment.
Figure 7B:
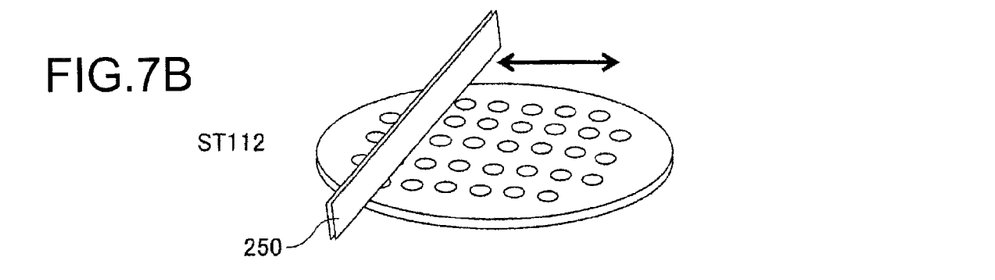

FIGS. 6 and 7 are diagrams illustrating a method of producing the optical unit according to this embodiment.

The diagram shown in FIG. 6 illustrates the entire outline of the method of producing the optical unit according to this embodiment.

The diagrams shown in FIGS. 7A and 7B illustrate the main part of the method of producing the optical unit according to this embodiment.

The method of producing the optical units 100, 100A and 100B according to this embodiment basically includes a lens forming step ST11, a bonding step ST12, and a dicing step ST13.

In the example shown in FIG. 6, there is illustrated a lens module forming step ST14. In FIG. 6, a cover glass 150 is placed in a lens holder 300, but it is possible to form a lens module like the configuration shown in FIG. 4.

In the lens forming step ST11, each of a plurality of different sets of a number of lenses, e.g., a set of first lenses 110(A, B), a set of second lenses 120(A, B), a set of third lenses 130(A, B), and a set of fourth lenses 140(A, B) according to this embodiment, is separately formed on the corresponding one of wafers at wafer level.

Concretely, a two dimensional array of a number of first lenses 110 is formed on a first wafer 210, and a two dimensional array of a number of second lenses 120A is formed on a second wafer 220.

Similarly, a two dimensional array of a number of third lenses 130A is formed on a third wafer 230, and a two dimensional array of a number of fourth lenses 140A is formed on a fourth wafer 240.

Each set of lenses 110 to 140 is formed on one of wafers 210, 220, 230, and 240 (substrates) of, for example, 8 inches in diameter so that the lenses are two-dimensionally arranged with 5-mm pitch.

The lens forming step ST11 includes an aspheric surface forming step ST111 shown in FIG. 7A and a functional surface forming step ST112 shown in FIG. 7B.

In the aspheric surface forming step ST111, one of the image side surface and the object side surface of at least one of the plurality of lenses is formed to be an aspheric surface at wafer level.

In the functional surface forming step ST112, the aspheric surface of the lens is formed to be an aperture stop surface having the function of an aperture stop or a light-shielding surface having the light-shielding function as shown in FIG. 2.

Concretely, in the aspheric surface forming step ST111 of the lens forming step ST11, the surface L1S2 to be the image side surface of the first wafer 210, in which the first lenses 110 are formed, is formed to be an aspheric surface.

In the functional surface forming step ST112, the aspheric surface L1S2 is coated with an aperture stop film to serve as an aperture stop surface. The coating may be applied by means of spraying using, for example, a spraying device 250 (see FIG. 7B).

In the aspheric surface forming step ST111 of the lens forming step ST11, the surface L2S1A to be an object side surface of the second wafer 210, in which the second lenses 120A are formed, is formed to be an aspheric surface.

In the functional surface forming step ST112, the aspheric surface L2S1A is coated with a light-shielding portion (light-shielding film) 180-1 to serve as a light-shielding surface. The coating may be applied by means of spraying using, for example, the spraying device 250 (see FIG. 7B).

In the aspheric surface forming step ST111 of the lens forming step ST11, the surface L4S1A to be an object side surface of the fourth wafer 240, in which the fourth lenses 140A are formed, is formed to be an aspheric surface.

In the functional surface forming step ST112, the aspheric surface L4S1A is coated with a light-shielding portion (light-shielding film) 180-2 to serve as a light-shielding surface. The coating may be applied by means of spraying using, for example, the spraying device 250 (see FIG. 7B).

In the functional surface forming step ST112, the aspheric surface L4S1A is coated with an IRCF film 310 to serve as both of a light-shielding surface and an IRCF surface. The coating may be applied by means of spraying using, for example, the spraying device 250 (see FIG. 7B).

Figure 8:
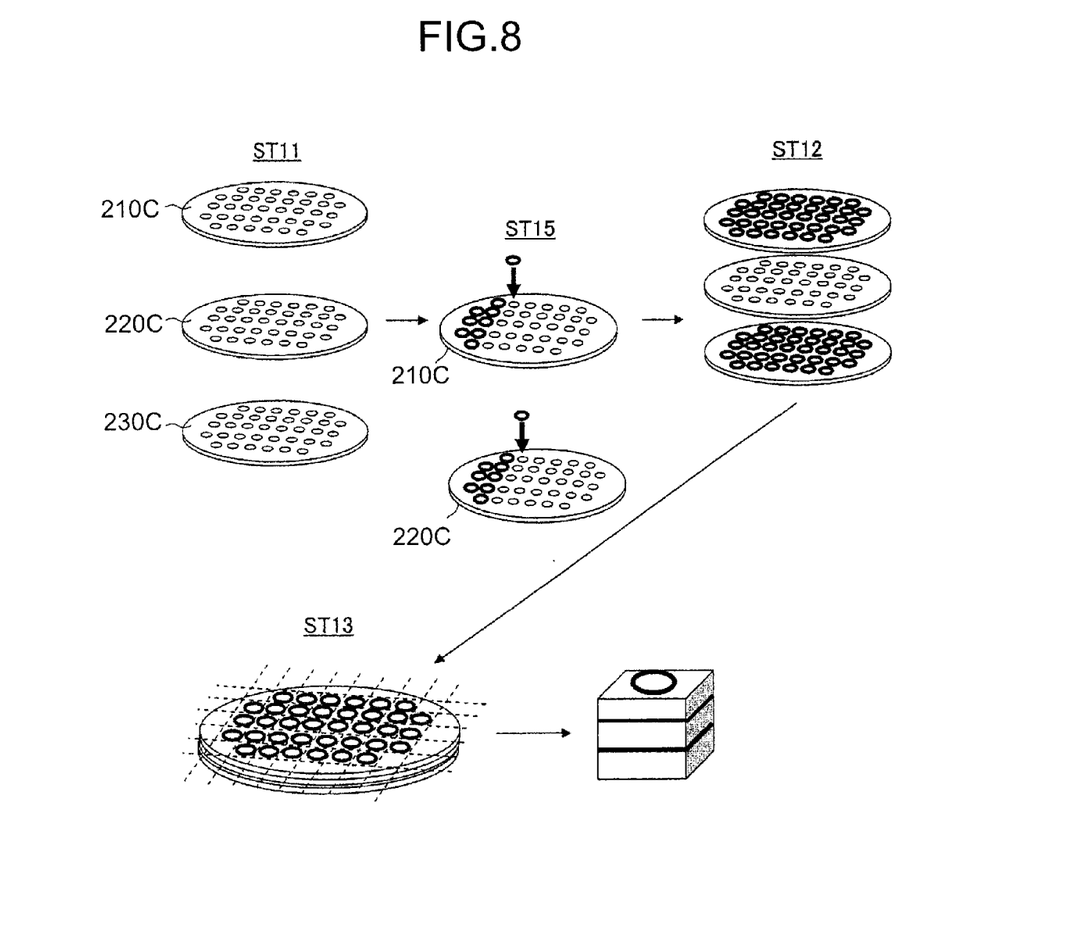
FIG. 8 is a diagram illustrating a process of producing an optical unit as a comparative example.

FIG. 8 is a diagram illustrating a process of producing an optical unit as a comparative example.

In this example, three wafers for three lenses are used for the sake of description. The same is applied to the case where four lenses are used as in this embodiment or the case where five or more lenses are used.

According to the comparative example, a lens forming step ST11 is followed by a sheet sticking step ST15.

In the sheet sticking step ST15, it is necessary to stick an aperture stop and a spacer to lens wafers 210C and 220C. In this case, in order to meet the accuracy requirements, it is necessary to put light-shielding components one by one on lenses on the wafer, which is cumbersome.

As can be seen above, according to the production method of this embodiment, one or more aspheric surfaces are incorporated into the design of a wafer-level lens structure and used as an aperture stop surface or a light-shielding surface.

Processing directly on a lens wafer, such as coating, is used to form an aperture stop surface or a light-shielding surface on an aspheric surface, which can be realized with high accuracy.

Besides, it is possible to decrease IRCFs and retention mechanisms by forming, by vapor deposition, an IRCF film on the light-shielding aspheric surface, which is advantageous in reduction in cost, height, and size of a module.

The present technology is applicable to, for example, an imprint molding method or an imprint apparatus for producing a structure with form accuracy of nanometer order, outline accuracy of micron order, and height accuracy of nanometer order.

The present technology is applicable also to a mold used for these molding method and molding apparatus and to a method of producing an optical element array plate using the molding method and molding apparatus.

Using the method of producing an optical element array plate, it is possible to produce an electronic element module.

The electronic element module includes a plurality of lenses to collect incident light or an optical element array plate including, for example, a plurality of optical functional elements to let outgoing light travel straight or to refract incoming light to travel in a predetermined direction.

The electronic element module includes an image pickup element including a plurality of light receivers, corresponding to each of lenses, to take an image after photoelectric conversion of optical imaging from an object.

The electronic element module includes a light-emitting element to emit outgoing light and/or a light-receiving element to receive incoming light, corresponding to each of the optical functional element.

The electronic element module is produced by bulk dicing of an electronic element wafer module including a plurality of modularized (unified) wafers.

The electronic element module produced by the above-mentioned method of producing an electronic element module may be used in the following electronic apparatus.

The electronic element module may be used in a digital camera such as a digital video camera and a digital still camera or an image input camera of a surveillance camera, which are employed as, for example, an image input device in an image pickup unit.

The electronic element module may be used in a scanner, a facsimile, a TV phone, a cell phone with a built-in camera, and a personal digital assistant (PDA), or a pickup apparatus using the electronic element module in an information recording/reproduction unit.

Thus, the optical units 100, 100A, and 100B having the functions as described above are usable as digital cameras which use an image pickup element such as a CCD sensor and a CMOS sensor, and more particularly as camera lenses installed in small electronic apparatuses such as cell phones.

<5. Configuration Example of Image Pickup Apparatus>

Figure 9:
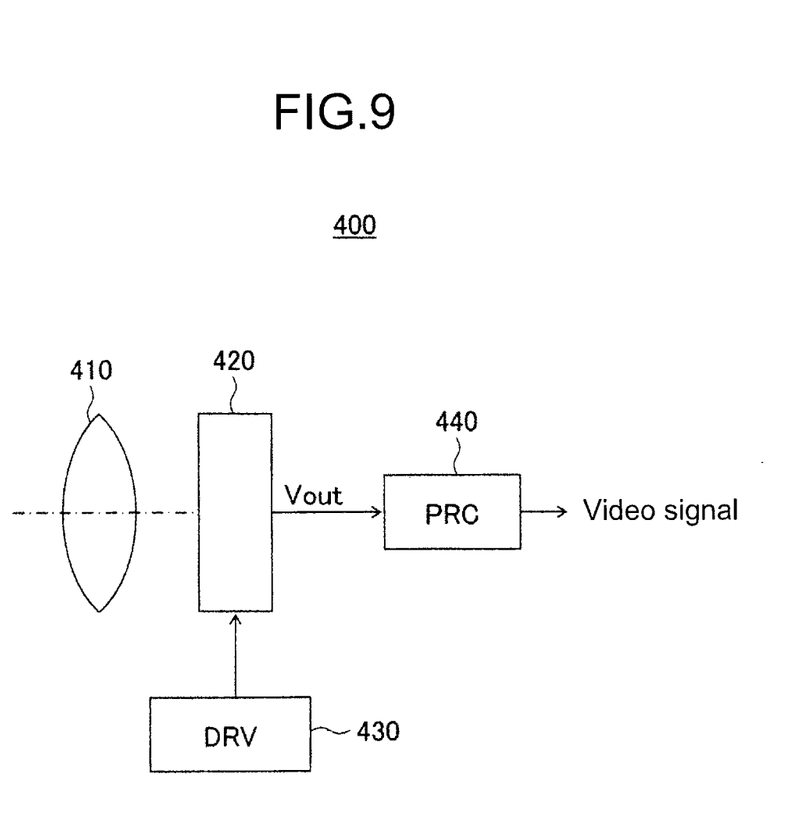
FIG. 9 is a block diagram showing a configuration example of an image pickup apparatus using an optical unit according to the embodiment.

FIG. 9 is a block diagram showing a configuration example of an image pickup apparatus using the optical unit according to this embodiment.

The image pickup apparatus 400 includes an optical system 410, in which the optical unit 100, 100A, or 100B is used, and an image pickup device 420, in which a CCD or CMOS image sensor (solid-state image pickup element) is usable.

The optical system 410 forms an object image by guiding incident light to an image plane including a pixel area of the image pickup device 420.

The image pickup apparatus 400 further includes a driver circuit (DRV) 430 for driving the image pickup device 420 and a signal processing circuit (PRC) 440 for processing an output signal of the image pickup device 420.

The driver circuit 430 includes a timing generator (not shown) which generates various timing signals involving a start and clock pulse for the drive of the circuit within the image pickup device 420 to drive the image pickup device 420 with predetermined timing signals.

The signal processing circuit 440 performs predetermined signal processing on the output signal of the image pickup device 420.

The image signal processed by the signal processing circuit 440 is recorded on a record medium such as a memory. The image information stored in the record medium may be printed by a printer or the like in hard copy form. The image signal processed by the signal processing circuit 440 may be displayed as video on a monitor of a liquid-crystal display or the like.

As can be seen above, it is possible to realize a camera with high accuracy and low power consumption by installing the above-mentioned optical unit 100, 100A, or 100B as the optical system 410 and the image pickup device in the image pickup apparatus such as a digital still camera.

The present technology may also take the following configurations.

(1) An optical unit, including:

a plurality of lenses arranged along an optical path from an object side toward an image side, the plurality of lenses including at least one lens including an image side surface and an object side surface, one of which is formed to be an aspheric surface at wafer level, the aspheric surface of the at least one lens being formed to serve as one of an aperture stop surface having an aperture stop function and a light-shielding surface having a light-shielding function.

(2) In the optical unit according to item (1), in which the image side surface of the at least one lens is formed to be the aspheric surface, and the aspheric surface is formed to serve as the aperture stop surface.

(3) In the optical unit according to item (1) or (2), in which the object side surface of the at least one lens of the plurality of lenses is formed to be the aspheric surface, and the aspheric surface is formed to serve as the light-shielding surface.

(4) In the optical unit according to any one of items (1) to (3), in which
on the aspheric surface of the at least one lens of the plurality of lenses, an infrared cut filter is formed, the aspheric surface being formed to serve as the light-shielding surface.

(5) In the optical unit according to item (4), in which
the plurality of lenses include a lens including an image side surface and an object side surface, one of which is formed to be an aspheric surface, and
the aspheric surface of the lens is formed to serve as the light-shielding surface having the light-shielding function, and
on the aspheric surface, the infrared cut filter is formed, the lens being the nearest to an image plane of an image pickup element, on which an object image is formed.

(6) A method of producing an optical unit, including:
forming a plurality of lenses on each of wafers at wafer level, the plurality of lenses being to be arranged along an optical path from an object side toward an image side;
bonding the plurality of lenses each formed on the wafer at wafer level to each other; and
dicing the bonded wafers to form a number of optical units,
the forming a plurality of lenses including
forming one of an image side surface and an object side surface of at least one lens of the plurality of lenses to be an aspheric surface at wafer level, and
forming the aspheric surface of the at least one lens to serve as one of an aperture stop surface having an aperture stop function and a light-shielding surface having a light-shielding function.

(7) The method according to item (6), in which
the forming a plurality of lenses further includes
forming a surface to be the image side surface of a wafer of the wafers, in which the at least one lens is formed, to be the aspheric surface, and
forming the aspheric surface to serve as the aperture stop surface.

(8) The method according to item (6) or (7), in which
the forming a plurality of lenses further includes
forming a surface to be the object side surface of a wafer of the wafers, in which the at least one lens of the plurality of lenses at wafer level is formed, to be the aspheric surface, and
forming the aspheric surface to serve as the light-shielding surface.

(9) The method according to any one of items (6) to (8), in which
the forming a plurality of lenses further includes
forming, on the aspheric surface of the at least one lens of the plurality of lenses, an infrared cut filter, the aspheric surface being formed to serve as the light-shielding surface.

(10) The method according to item (9), in which
the forming a plurality of lenses further includes
forming one of a surface to be an object side surface and a surface to be an image side surface of a wafer of the wafers, in which a lens of the plurality of lenses at wafer level is formed, to be an aspheric surface, the lens being the nearest to an image plane of an image pickup element, on which an object image is formed,
forming the aspheric surface to serve as the light-shielding surface having the light-shielding function, and
forming the infrared cut filter on the aspheric surface.

(11) An image pickup apparatus, including:
an image pickup element;
an optical unit configured to form an object image on the image pickup element; and
a signal processing unit configured to perform predetermined signal processing on an output signal of the image pickup element, the optical unit including
a plurality of lenses arranged along an optical path from an object side toward an image side, the plurality of lenses including at least one lens including an image side surface and an object side surface, one of which is formed to be an aspheric surface at wafer level, the aspheric surface of the at least one lens being formed to serve as one of an aperture stop surface having an aperture stop function and a light-shielding surface having a light-shielding function.

The present disclosure contains subject matter related to that disclosed in Japanese Priority Patent Application JP 2011-177137 filed in the Japan Patent Office on Aug. 12, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An optical unit, comprising:
a plurality of lenses arranged along an optical path from an object side toward an image side,
the plurality of lenses including at least one lens having an image side surface and an object side surface, one of which is configured to be an aspheric surface at wafer level,
the aspheric surface of the at least one lens being configured to serve as one of an aperture stop surface having an aperture stop function and a light-shielding surface having a light-shielding function,
wherein an infrared cut filter is formed on the aspheric surface of the at least one lens, the aspheric surface being configured to serve as the light-shielding surface.
2. The optical unit according to claim 1, wherein
the image side surface of the at least one lens is formed to be the aspheric surface, and
the aspheric surface is formed to serve as the aperture stop surface.
3. The optical unit according to claim 1, wherein
the object side surface of the at least one lens of the plurality of lenses is formed to be the aspheric surface, and
the aspheric surface is formed to serve as the light-shielding surface.
4. The optical unit according to claim 1, wherein
the plurality of lenses includes a first lens having the image side surface and the object side surface, one of which is formed to be the aspheric surface, and
the aspheric surface of the first lens is configured to serve as the light-shielding surface having the light-shielding function, and
on the aspheric surface, the infrared cut filter is formed, the first lens being the nearest to an image plane of an image pickup element, on which an object image is formed.
5. A method of producing at least one optical unit, comprising:
forming a plurality of lenses on each wafer of a plurality of wafers at wafer level, the plurality of lenses being arranged along an optical path from an object side toward an image side;

bonding the plurality of lenses, each formed on said each wafer of a plurality of wafers at wafer level, to each other; and dicing the bonded plurality, including the plurality of wafers, to form the at least one optical unit, wherein the forming the plurality of lenses further includes forming one of an image side surface and an object side surface of at least one lens of the plurality of lenses to be an aspheric surface at wafer level, forming the aspheric surface of the at least one lens to serve as one of an aperture stop surface having an aperture stop function and a light-shielding surface having a light-shielding function, and forming an infrared cut filter on the aspheric surface of the at least one lens, the aspheric surface being configured to serve as the light-shielding surface.

6. The method of producing at least one optical unit, according to claim 5, wherein the forming the plurality of lenses further includes forming the image side surface of the at least one lens to be the aspheric surface, and forming the aspheric surface to serve as the aperture stop surface.

7. The method of producing at least one optical unit, according to claim 5, wherein the forming the plurality of lenses further includes forming be the object side surface of the at least one lens of the plurality of lenses at wafer level to be the aspheric surface, and forming the aspheric surface to serve as the light-shielding surface.

8. The method of producing at least one optical unit, according to claim 5, wherein the plurality of lenses includes a first lens having the image side surface and the object side surface, one of which is formed to be the aspheric surface, and the forming the plurality of lenses further include forming the aspheric surface to serve as the light-shielding surface having the light-shielding function, and forming the infrared cut filter on the aspheric surface, the first lens being the nearest to an image plane of an image pickup element, on which an object image is formed.

9. An image pickup apparatus, comprising:

an image pickup element configured to produce an output signal;

an optical unit configured to form an object image on the image pickup element; and a signal processing circuit configured to perform predetermined signal processing on the output signal of the image pickup element, wherein the optical unit includes a plurality of lenses arranged along an optical path from an object side toward an image side, the plurality of lenses including at least one lens having an image side surface and an object side surface, one of which is configured to be an aspheric surface at wafer level, the aspheric surface of the at least one lens being configured to serve as one of an aperture stop surface having an aperture stop function and a light-shielding surface having a light-shielding function, and wherein an infrared cut filter is formed on the aspheric surface of the at least one lens, the aspheric surface being configured to serve as the light-shielding surface.

* * * * *